Aug. 8, 1939.    H. B. HOLMES ET AL    2,168,341
FISHWAY
Filed March 1, 1938    3 Sheets-Sheet 1

Inventors
Harlan B. Holmes, Henry Blood,
and Milo C. Bell
By Adam Richmond
Attorney.

Aug. 8, 1939.  H. B. HOLMES ET AL  2,168,341
FISHWAY
Filed March 1, 1938  3 Sheets-Sheet 2

INVENTORS
Harlan B. Holmes, Henry Blood,
and Milo C. Bell.
By Adam Richmond
ATTORNEY Aug. 8, 1939.　　　H. B. HOLMES ET AL　　　2,168,341
FISHWAY
Filed March 1, 1938　　　3 Sheets-Sheet 3

INVENTORS
Harlan B. Holmes, Henry Blood,
and Milo C. Bell.
BY Adam Richmond
ATTORNEY Patented Aug. 8, 1939

2,168,341

UNITED STATES PATENT OFFICE 2,168,341

FISHWAY

Harlan B. Holmes and Henry F. Blood, Portland, Oreg., and Milo C. Bell, Seattle, Wash., assignors to United States of America, as represented by Secretary of War Application March 1, 1938, Serial No. 193,292

6 Claims. (Cl. 61—21)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to improved methods and structures for attracting fish into fishways at dams and other obstructions to the passage of fish in their migrations up stream.

In the development of the art of fishways attention has been directed most exclusively to providing means by which fish after entering the water level device may climb or be carried to the water level above the obstruction without excessive exertion on the part of the fish. Very little attention has been given to the problem of inducing the fish to enter the fishway. It generally has been assumed that the quantity of water allowable to a fishway must be comparatively small. It naturally has followed that the entrance to the fishway also must be correspondingly small. As a result of this trend of development, the greatest single cause of failure and inefficiency in fishways is the failure of the fish to find the entrance, rather than their inability to negotiate the passage provided.

The fact that fish eventually find the entrance to a fishway does not justify the conclusion that the device is successful. Fish frequently are seriously injured in their efforts to surmount the obstruction before finding the entrance to the fishway. In the case of the Pacific salmon, which do not feed while making their upstream migration to the spawning grounds, a prolonged delay at an obstruction while the fish is seeking a way to pass, may cause an excessive expenditure of the fish's limited supply of energy stored in the form of fat, with the result that the fish may be unable to complete its migration and perform the rigorous act of spawning.

Fish such as salmon and trout, which are strong swimmers, are found in comparatively rapidly flowing streams and are inclined upon encountering an obstruction to seek a route of passage by way of the discharge through the spillways and power wheels, rather than to search for a route leading from the areas of quiet water. The fishways, therefore, must compete with these points of discharge in attracting the fish. Due to limitations in cost, structural design, space, and water economy, the size of a fishway usually is limited. The quantity of water that can be carried by these limited structures and the area over which this water can be distributed at the entrance, are so slight that the attraction furnished by the fishway is insignificant when compared with the counter attractions represented by the spillway and power wheel discharges.

The effectiveness of a fishway entrance depends to a great extent upon its location with respect to the obstruction and the counter attractions. For example, it is desirable in general to place the fishway entrance adjacent to the spillway or draft tube openings where advantage may be taken of the concentration of fish at these counter attractions. The exact position of these favorable locations usually varies with power house operation, spillway regulation, and river stages. Conventional fishway practice usually does not permit flexibility in the nature and position of fishway entrance to correspond with these differing conditions.

The primary object of the invention is to improve the effectiveness of a fishway entrance by increasing the size of the entrance and introducing into it an auxiliary supply of moving water much greater in quantity than economically can be passed through the fishway proper, this auxiliary water being introduced into the entrance in such a manner that it does not constitute a counter attraction, but leads the fish in the direction to be followed in passing through the fishway.

Another object is to provide means of maintaining the effectiveness of a fishway entrance in spite of extreme fluctuations in river flow and accompanying fluctuations in tail-race elevation.

Another object is to provide means of controlling the quantity and velocity of water discharge through the entrance of fishways.

Another object is to improve the effectiveness of a fishway by providing multiple entrances varied in nature and position with relation to the obstruction and the flow of water over or through the obstruction.

Another object of this invention is to provide a powerhouse dam construction wherein a series of fish entrances are arranged substantially across the downstream face of the construction and above the draft tubes, communicating with a collection bay extending the full length of the dam, the collection bay terminating at one end in an entrance bay leading to a plurality of fish locks.

Other objects relating to the details of construction, combination and arrangement of parts will hereinafter appear in the description to follow.

Referring more particularly to the accompanying drawings in which corresponding parts are indicated by similar reference characters:

Figure 1:
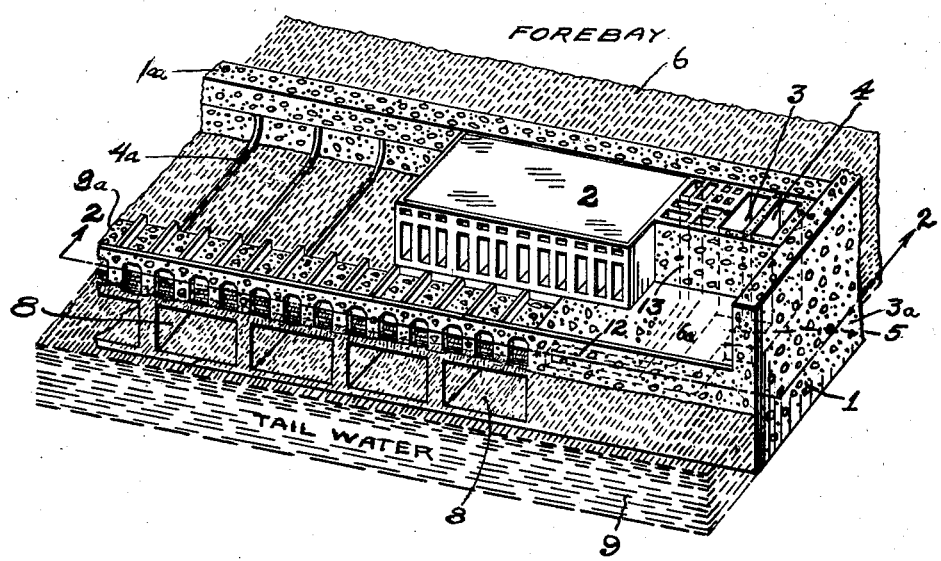
Fig. 1 is a perspective view of a power-house dam construction, illustrating the arrangement of the fish entrances above the draft tubes and showing the collection bay extending the full length of the dam and communicating at one end with an entrance bay leading into a pair of fish locks.

In the illustrated embodiment characterizing this invention 1 indicates a power-house dam construction consisting of, an upstream wall 1a, a downstream wall 2a, an end wall 3a, a series of laterally spaced foundation members 4a, extending between the walls and adapted to serve as supports for additional sections of the powerhouse, a water supply section 5a, and fish lifts 3 and 4 in controlled communication at their upper ends with the forebay 6 and at their lower ends with entrance bay 5 formed in the portion 6a of downstream wall 2a, as clearly shown in Fig. 1 of the drawings. The lower portion of the downstream wall 2a is provided with a series of draft tubes 8 which are adapted to discharge into the tailrace 9. These tubes establish communication between the forebay 6 and tailrace 9 via suitable turbines (not shown) adapted to be located in the power-house 2, as will be understood without further discussion.

Figure 2:
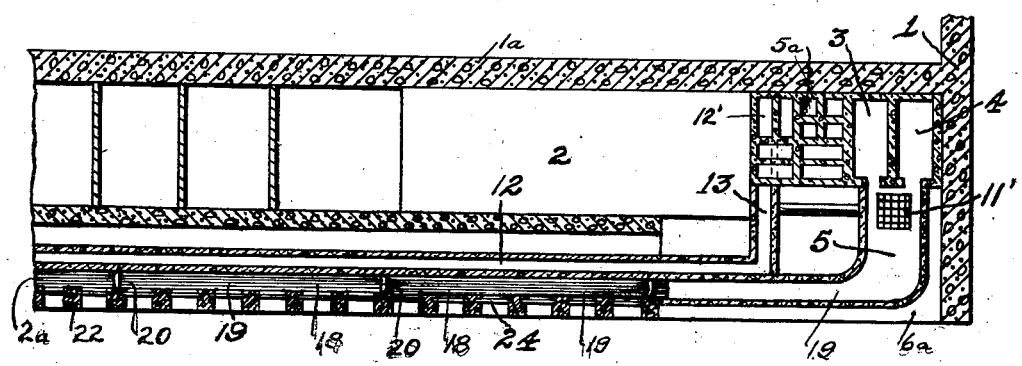
Fig. 2 is a horizontal section taken on the line of 2—2 of Fig. 1.
Figure 3:
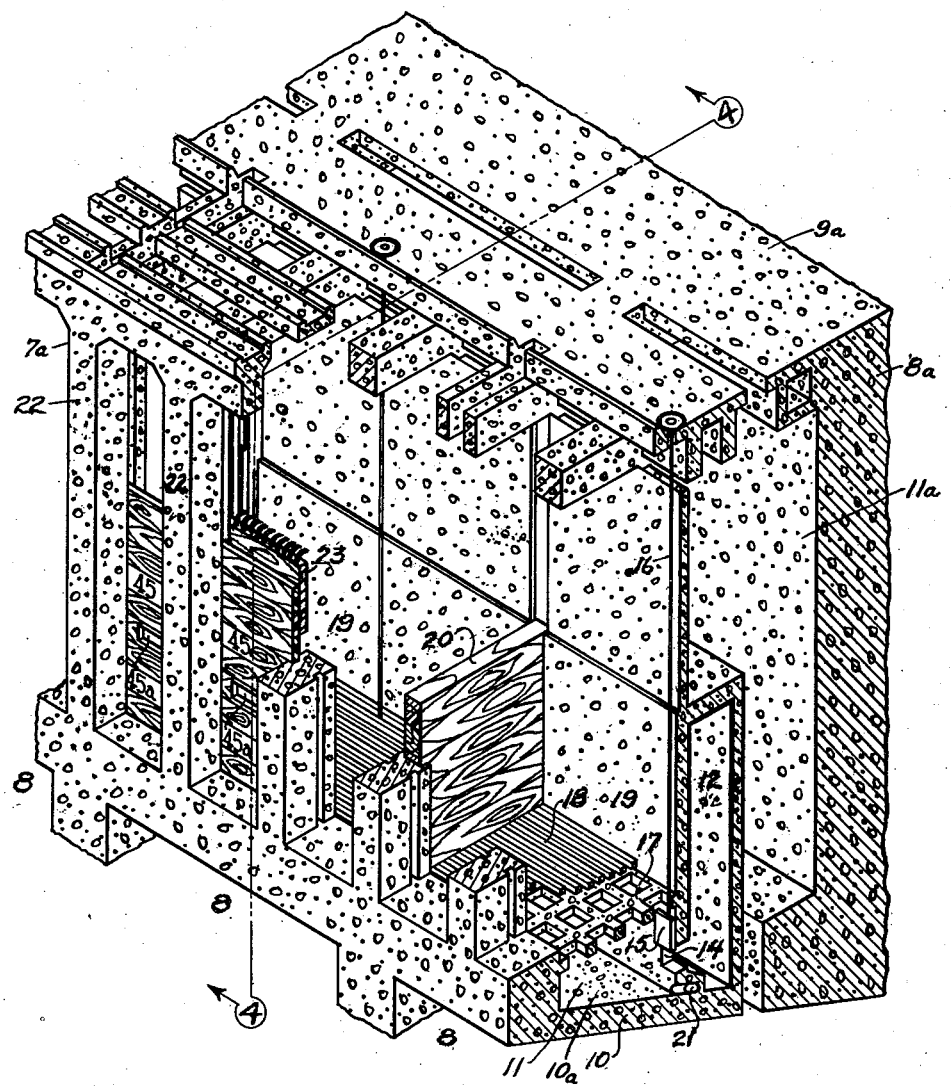
Fig. 3 is a fragmentary sectionized perspective, illustrating the interior arrangement of the collection bay and showing the conduit arrangement for supplying additional water to the collection bay.
Figure 4:
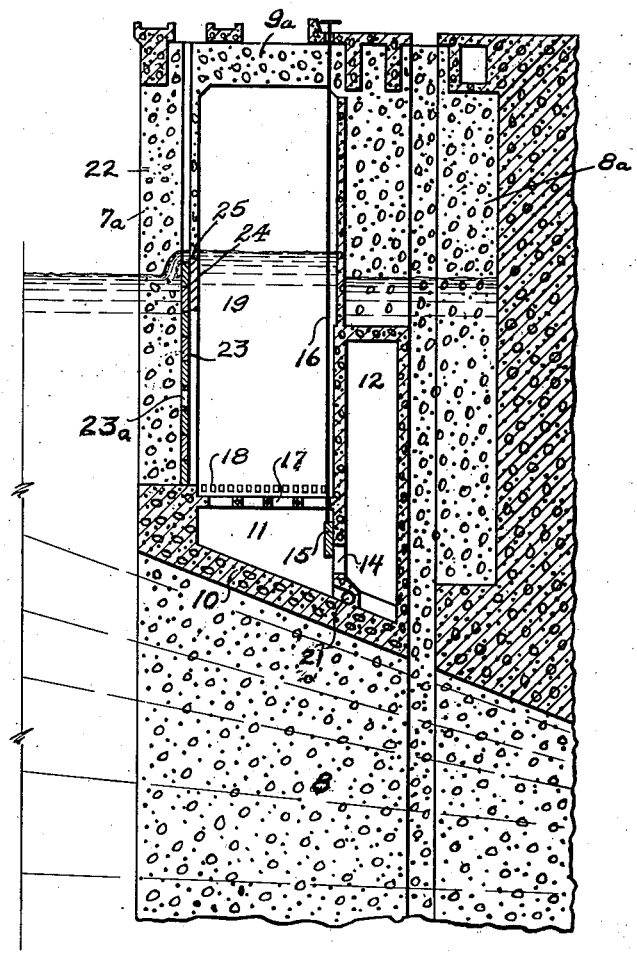
Fig. 4 is a transverse vertical section taken on the line 4—4, of Fig. 3.

Within the upper portion of the downstream wall and coextensive with its length is a collection bay or channel 19. This collection bay or channel 19 which is defined by the front wall portion 7a, the rear wall portion 8a and the roof portion 9a of downstream wall 2a, extends at one end into the portion 6a and opens into entrance bay 5, as clearly shown in Fig. 2 of the drawings. The opposite end of the channel 19 is adapted to be connected to suitable fishways (not shown). The roof portions of the draft tubes 8, which as shown in Figs. 3 and 4 of the drawings, are in the form of inclined slabs 10, not only serve as the roofs of the draft tubes but also function collectively as the floor structure for a passage 10a which extends lengthwise of the downstream wall 2a above the draft tubes 8 and below the collection bay of channel 19. Passage 10a is divided into a series of diffusion chambers 11, one of which is disposed above each of the draft tubes.

Within an opening 11a formed in the rear wall portion 8a of the downstream wall 2a and immediately to the rear of collection bay 19 is a conduit 12, having one end closed and the other in controlled communication with forebay 6 through the vertically disposed passage 12' in the water supply section 4a, as clearly shown in Fig. 1 of the drawings. The upper end of passage 12' opens into forebay 6 through a control passage (not shown). The lower portion of the conduit 12 adjacent the diffusion chambers 11 is in communication with said chambers through apertures 14, which are adapted to be controlled by valves 15 operated by handwheel mechanisms 16.

An additional diffusion chamber 11', also in valve controlled communication with the forebay 6, through passage 13, is provided immediately in front of the entrance to the fish locks 3 and 4.

Each of the diffusion chambers as 11 is provided with an apertured partition 17 substantially horizontally disposed, and spaced apart from the slab 10. Suitable grillage 18, having apertures of a size to restrain fish from entering the diffusion chamber is suitably spaced above the apertured partition 17. The flow of water from the conduit 12 is introduced into the diffusion chambers 11 at a rate below that which would lure the fish into vainly attempting to follow the current passing through the grillage 18. The amount of water introduced from the conduit 12 is controlled to maintain substantially uniform directional velocity through the collection bay 19.

All of the diffusion chambers open, via the apertured partition 17 and the grillage 18, into the collection bay 19, which has one extremity opening into entrance bay 5 and the other in controlled communication with a suitable fishway (not shown). These fishways, which may be in the form of fish ladders or fishlifts serve to effect a transfer of the fish from the collection bay to the forebay, as will be understood without further discussion.

The collection bay 19 may be provided with suitable means as stop logs 20, whereby any portion of the collection bay may be isolated for inspection, cleaning, and/or repair.

Each of the diffusion chambers 11 may be provided with suitable drainage means as conduit 21, whereby it may be drained to facilitate inspection, cleaning, and/or repairs.

The front wall portion 7a of downstream wall 2a is formed with a series of spaced columns 22. Adjustable stop logs 23 are suitably disposed between the columns 22 and cooperate with regulating gates 24 to provide means whereby the elevation of the water within the collection bay may be suitably controlled to accommodate variations in tailrace level and to provide any desired localization of flow. Suitable traps comprised of closely spaced curved rods 25 extending upwardly and toward the collection bay are disposed on the top of each regulating gate 24. Submerged openings, as 23a, may be provided in the adjustable stop logs 23 by the substitution of suitable apertured members.

The collecting system as described conveys the fish to a pair of fish locks 3 and 4. It is to be understood that any satisfactory type of fishway may be substituted for the fish locks.

In case the economy of water for use in generating power is a consideration of importance, the auxiliary water supplied through conduit 12 may be pumped from the tailrace by low head pumps at a lesser expenditure of energy.

The operation of the structure described immediately above is as follows:

Water flowing from one of the fish locks 3 or 4 is augmented by a flow of water from the diffusion chamber 11' situated immediately in front of the lock entrance. The flow from the diffusion chamber 11' is regulated in accordance with the existing tailrace level so as to produce the desired velocity along the collection passage 19. A part of water flowing along the closed portion of the collection passage is lost to the tailrace over the first weir gate 24. A corresponding quantity of water is added through the diffusion chamber 11 which is opposite this first weir gate. By a repetition of this procedure of adding water from the diffusion chambers 11 as it is lost over the weir gates 24, the quantity of water and therefore the velocity passing along the entire length of the collection bay can be maintained in any desired constant condition.

Fish attracted by the water flowing over the weir gates 24, swim over one of these gates into the collection bay 19. Continuing to swim against the current, the fish are directed in a normal manner to the fish locks 3 and 4. The course of the fish in passing along the collection bay 19 is not influenced by the flow of water introduced through the diffusion chambers 11, because the velocity at which this water is introduced is so much lower than the longitudinal velocity in the collection bay that it is not distinguishable to the fish. The trapping means on the regulating gates 24 is provided to assure that the fish while passing along the collection bay 19 will not return to the tailrace.

The operation of any of the hydraulic power equipment will be accompanied by a flow of water through certain of the draft tubes 8. If but a single turbine is in operation, the flow will be confined to but one draft tube, whereas if all of the turbines are in operation, the flow will emerge from all of the draft tubes.

This flow constitutes a counter attraction with which the fishway must compete in attracing the fish. The most favorable position for the fishway entrances depends upon the number of units that are in operation and the hydraulic conditions produced by them. It frequently is impossible to determine in advance for each mode of powerhouse operation, just where will be the most favorable positions for the fishway entrances. The collecting system therefore is designed to provide a plurality of entrances any or all of which may be used to suit prevailing conditions. The plurality of entrances with their accompanying auxiliary water supplies through diffusion chambers 11 also permits for the attraction of fish, the use of a quantity of water much greater than could be provided by the fish locks 3 and 4 or any other conventional type of fishway.

While the structure shown and described is the preferred embodiment of the invention, it is to be understood that the general structure, arrangement, and combination of parts may be altered by those skilled in the art without departing from the spirit of the invention as defined by the following claims.

Having thus described the invention, what we claim and wish to secure by Letters Patent is:

1. In a structure of the class described, the combination of a dam provided with a forebay and a tailrace, a collection bay disposed adjacent said dam and provided with a portal leading to the tailrace, a weir disposed in said portal, and a fishway disposed between the collection bay and the forebay for effecting the transfer of fish between the collection bay and the forebay.

2. In a structure of the class described, the combination of a dam provided with a forebay and a tailrace, a collection bay disposed adjacent said dam and provided with a portal leading to the tailrace, an adjustable weir disposed in said portal, a diffusion chamber disposed below the collection bay, an apertured partition disposed over the diffusion chamber, a grill disposed between the apertured partition and the collection bay, a conduit effecting controlled hydraulic communication between the forebay and the diffusion chamber, and a fishway disposed between the collection bay and the forebay for effecting the transfer of fish between the collection bay and the forebay.

3. In a structure of the class described, in combination with a dam provided with a forebay and a tailrace, a collection bay disposed adjacent said dam and provided with a plurality of portals leading to the tailrace, a plurality of adjustable weirs disposed one each in each of said portals, a diffusion chamber disposed below the collection bay and in open communication therewith, a conduit effecting controlled hydraulic communication between the forebay and the diffusion chamber, and a fishway disposed between the collection bay and the forebay.

4. In a power-house dam construction the combination with a dam provided with a forebay, a tailrace and a downstream wall adjacent the tailrace, of a collection bay within the wall and in controlled communication with the forebay through a series of diffusion chambers underlying the collection bay, said collection bay opening into the tailrace through a portal in the wall, an adjustable weir within the portal and a fishway disposed between the collection bay and the forebay for effecting a transfer of fish therebetween.

5. In a power-house dam construction, the combination with a dam provided with a forebay, a tailrace and a downstream wall adjacent the tailrace, of intercommunicating collection and entrance bays within the wall, the collection bay being in controlled communication with the forebay and opening into the tailrace through a portal formed in the wall, an adjustable weir disposed within said portal and a fishway between the entrance bay and the forebay for effecting the transfer of fish from the entrance bay to the forebay.

6. In a power-house dam construction, the combination with a dam provided with a forebay, a tailrace and a downstream wall adjacent the tailrace, of a series of draft tubes formed in the wall, said tubes being in controlled communication with the forebay and discharging into said tailrace, a collection bay within the wall and in controlled communication with the forebay, said collection bay extending lengthwise of the wall opening into the tailrace through a series of portals formed in said wall above the draft tubes, an adjustable weir in each of said portals and a fishway disposed between the collection bay and the forebay for effecting a transfer of fish between said collection bay and said forebay.

HARLAN B. HOLMES.
HENRY F. BLOOD.
MILO C. BELL.